(12) United States Patent
Urcia et al.

(10) Patent No.: US 11,463,166 B2
(45) Date of Patent: Oct. 4, 2022

(54) CONFORMAL LOAD BEARING DISTRIBUTED SENSING ARRAYS

(71) Applicant: The Boeing Company, Chicago, IL (US)

(72) Inventors: Manny S. Urcia, Chicago, IL (US); Jonathan M. St. Clair, Chicago, IL (US); Christopher M. La Fata, Chicago, IL (US); John G. Castagno, Chicago, IL (US); Ordie D. Butterfield, Chicago, IL (US); Stephen T. Tyahla, Chicago, IL (US); Alec Adams, Chicago, IL (US); Lixin Cai, Chicago, IL (US)

(73) Assignee: The Boeing Company, Chicago, IL (US)

(*) Notice: Subject to any disclaimer, the term of this patent is extended or adjusted under 35 U.S.C. 154(b) by 246 days.

(21) Appl. No.: 16/936,903

(22) Filed: Jul. 23, 2020

(65) Prior Publication Data

US 2020/0358527 A1     Nov. 12, 2020

Related U.S. Application Data

(60) Division of application No. 15/156,237, filed on May 16, 2016, now Pat. No. 10,756,814, which is a
(Continued)

(51) Int. Cl.
| | | |
|---|---|---|
| *H04B 10/00* | (2013.01) | |
| *H04B 10/112* | (2013.01) | |
| *H04B 10/50* | (2013.01) | |
| *H04B 10/66* | (2013.01) | |

(Continued)

(52) U.S. Cl.
CPC ............. *H04B 10/112* (2013.01); *G01S 1/00* (2013.01); *G01S 13/42* (2013.01); *G01S 17/42* (2013.01);
(Continued)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

| 8,334,758 B2 | 12/2012 | Baruco et al. |
| 8,384,583 B2 | 2/2013 | Leva et al. |

(Continued)

OTHER PUBLICATIONS

OTTONAVI Blind Spot Sensor Full Installation Video screenshots (2), https://www.youtube.com/watch?v=IG_IK1Ff8xl, Published Jul. 9, 2015, Ottonavi customer service (Year: 2015).

(Continued)

*Primary Examiner* — Daniel G Dobson
(74) *Attorney, Agent, or Firm* — Haynes and Boone, LLP (57) ABSTRACT

Systems, methods, and apparatus for an electromagnetic (EM) panel are disclosed. In one or more embodiments, a disclosed electromagnetic (EM) panel comprises an outer skin, an inner skin, a core disposed between the outer skin and the inner skin, and at least one receiver to receive at least one first signal. In at least one embodiment, at least one receiver is disposed within an opening on the outer skin of the EM panel. At least one receiver is an optical sensor(s) and/or a radio frequency (RF) antenna(s). In one or more embodiments, the EM panel further comprises at least one transmitter to transmit at least one second signal. In at least one embodiment, at least one transmitter is disposed within an opening on the outer skin of the EM panel. At least one transmitter is a laser(s) and/or a RF antenna(s).

20 Claims, 9 Drawing Sheets

Related U.S. Application Data continuation-in-part of application No. 14/840,953, filed on Aug. 31, 2015, now Pat. No. 9,866,319.

(51) Int. Cl.
*G01S 1/00* (2006.01)
*H01Q 5/22* (2015.01)
*G01S 17/42* (2006.01)
*H04B 7/185* (2006.01)
*G01S 13/42* (2006.01)
*H04J 14/00* (2006.01)
*H01Q 1/28* (2006.01)

(52) U.S. Cl.
CPC ........... *H01Q 5/22* (2015.01); *H04B 7/18506* (2013.01); *H04B 10/503* (2013.01); *H04B 10/66* (2013.01); *H01Q 1/286* (2013.01)

(58) Field of Classification Search
CPC ............ H04B 10/1127; H04B 10/1129; H01Q 1/286; H01Q 1/287
See application file for complete search history.

(56) References Cited

U.S. PATENT DOCUMENTS

| | | | |
|---|---|---|---|
| 2007/0030681 A1* | 2/2007 | Farrell | H05K 1/038 362/257 |
| 2013/0278475 A1* | 10/2013 | Sabielny | H01Q 13/18 343/769 |
| 2015/0062927 A1 | 3/2015 | Hirakata et al. | |
| 2017/0271745 A1* | 9/2017 | Yun | H01Q 1/286 |
| 2017/0361584 A1 | 12/2017 | Feng et al. | |

OTHER PUBLICATIONS

Nissan North America, Inc., "2012 Pathfinder Owner's Manual", (Year: 2011).

Mercedes-Benz, "GLK-Class Operator's Manual", 2014 (Year: 2014).

\* cited by examiner

CONFORMAL LOAD BEARING DISTRIBUTED SENSING ARRAYS

CROSS-REFERENCE TO RELATED APPLICATIONS

This application is a Divisional application of, and claims the benefit of, U.S. patent application Ser. No. 15/156,237, filed May 16, 2016, which is a Continuation-In-Part application of, and claims the benefit of, U.S. patent application Ser. No. 14/840,953, filed on Aug. 31, 2015, issued as U.S. Pat. No. 9,866,319, which are all hereby incorporated by reference in their entirety.

FIELD

The present disclosure relates to sensing arrays (i.e. sensor aperture arrays). In particular, it relates to conformal load bearing distributed sensing arrays.

BACKGROUND

Distributed sensing systems require a multi-spectral sensor array (i.e. a multi-spectral sensor aperture array) that is distributed on a platform of a vehicle. Due to the number of sensors (i.e. sensor apertures) required on the platform, typical integration techniques will not suffice because they are not conformal to the vehicle (e.g., the sensor array adds drag to vehicle) nor integrated into the vehicle's structure (e.g., the sensor array consumes excessive volume).

Currently, multi-spectral sensor arrays are typically assembled into a rigid structure (e.g., a pod or turret). This structure is then integrated onto the platform of a vehicle. The drawbacks to this design are that (1) the structure (and sensors) typically protrudes into the airstream, which creates drag for the vehicle; and (2) the structure is inefficient to form a distributed sensing array on the platform. As such, there is need for an improved multi-spectral sensing array design.

SUMMARY

The present disclosure relates to a method, system, and apparatus for conformal load bearing distributed sensing arrays (i.e. conformal load bearing distributed sensing aperture arrays). In one or more embodiments, an electromagnetic (EM) panel (e.g., a conformal load bearing distributed sensing array) comprises an outer skin, an inner skin, a core disposed between the outer skin and the inner skin, and at least one receiver to receive at least one first signal (e.g., an EM radiation signal, such as an optical frequency signal or a radio frequency (RF) signal). In at least one embodiment, at least one receiver is disposed within an opening on the outer skin of the EM panel.

In one or more embodiments, at least one receiver is an optical sensor(s) (e.g., an optical telescope) and/or a RF antenna(s) (e.g., a phased array antenna or a patch antenna). In some embodiments, at least one receiver comprises a structural housing.

In at least one embodiment, the EM panel further comprises at least one transmitter to transmit at least one second signal (e.g., an EM radiation signal, such as an optical frequency signal or a RF signal). In some embodiments, at least one transmitter is disposed within an opening on the outer skin of the EM panel.

In one or more embodiments, at least one transmitter is a laser(s) (e.g., an optical laser) and/or a RF antenna(s) (e.g., a phased array antenna or a patch antenna). In some embodiments, at least one transmitter comprises a structural housing.

In one or more embodiments, the EM panel is disposed conformally within an opening on a surface of a vehicle such that the EM panel is flush with the surface. In some embodiments, the vehicle is an airborne vehicle (e.g., an aircraft or an unmanned aircraft (UAV), such as a drone), a terrestrial vehicle (e.g., a tank), or a marine vehicle (e.g., a military ship). In at least one embodiment, the EM panel is replaceable as a single unit.

In at least one embodiment, the EM panel is one of a regular shape (e.g., a diamond, a square, a rectangle, a triangle, a regular polygon, a circle, or an ellipse) or an irregular shape (e.g., an irregular polygon). In some embodiments, the core is three-dimensionally (3D) printed. In at least one embodiment, the EM panel further comprises a structural frame that wraps around a perimeter of the EM panel.

In one or more embodiments, a method for repairing an electromagnetic (EM) panel involves electrically and mechanically disconnecting the EM panel from a vehicle, where the EM panel is disposed within an opening on a surface of the vehicle such that the EM panel is flush with the surface. The method further involves removing the EM panel from the opening on the surface of the vehicle. Also, the method involves electrically and mechanically disconnecting at least one receiver and/or at least one transmitter from the EM panel, where the receiver(s) and/or the transmitter(s) is not working properly. In addition, the method involves removing at least one receiver and/or at least one transmitter from an opening, for each of at least one receiver and/or at least one transmitter, on an outer skin the EM panel. Additionally, the method involves installing at least one replacement receiver and/or at least one replacement transmitter in the opening, for each at least one receiver and/or at least one transmitter, on the outer skin the EM panel. In addition, the method involves electrically and mechanically connecting at least one replacement receiver and/or at least one replacement transmitter to the EM panel. Additionally, the method involves installing the EM panel in the opening on the surface of the vehicle. Further, the method involves electrically and mechanically connecting the EM panel to the vehicle.

In one or more embodiments, a method for an electromagnetic (EM) panel (e.g., a conformal load bearing distributed sensing array) involves receiving, with at least one receiver, at least one first signal (e.g., an EM radiation signal, such as an optical frequency signal or a radio frequency (RF) signal). In at least one embodiment, the EM panel comprises an outer skin, an inner skin, and a core disposed between the outer skin and the inner skin. In some embodiments, at least one receiver is disposed within an opening on the outer skin of the EM panel.

In at least one embodiment, the method further involves transmitting, with at least one transmitter, at least one second signal (e.g., an EM radiation signal, such as an optical frequency signal or a RF signal). In some embodiments, at least one transmitter is disposed within an opening on the outer skin of the EM panel. In one or more embodiments, at least one transmitter is a laser(s) (e.g., an optical laser) and/or a RF antenna(s) (e.g., a phased array antenna or a patch antenna). In some embodiments, at least one transmitter comprises a structural housing.

One embodiment is a method of establishing a free space optical link comprising creating a first link between a first vehicle and a second vehicle and pointing a laser from the first vehicle to the second vehicle. The method comprises steering the laser in a pattern and recording a time at the first vehicle of each incremental position of the laser in the pattern. The pattern may be a spiral pattern. The method comprises detecting the laser at the second vehicle, recording the time of detection at the second vehicle, and steering the laser to the positions that coincide with the detection times of the second vehicle to establish an optical link between the first and second vehicles. The first link may comprise a RF link.

The method may comprise indicating a time and a position of each of the first and second vehicles over the RF link prior to steering the laser in the spiral pattern. Indicating the position of each of the first and second vehicles over the RF link may further comprise the first vehicle determining its position based on a virtual 3D model and the second vehicle determining its position based on a virtual 3D model. The method may comprise transmitting the detection times of the laser from the second vehicle to the first vehicle over the RF link prior to steering the laser to the positions that coincide with the detection times of the second vehicle.

The method may comprise confirming detection of the laser by the second vehicle at the positions that coincide with the detection times over the RF link prior to establishing the optical link. When the second vehicle cannot confirm detection of the laser over the RF link, the method may comprise repeating the steps of steering the laser in the spiral pattern, recording the time of each incremental position of the laser in the spiral pattern, detecting the laser at the second vehicle and recording the time of detection, transmitting the detection times of the laser from the second vehicle to the first vehicle over the RF link, and steering the laser to the positions that coincide with the detection times transmitted from the second vehicle until the first vehicle receives confirmation of detection of the laser by the second vehicle over the RF link. The method may comprise disconnecting the RF link between the first and second vehicles. The method may comprise transferring data between the first and second vehicles over the optical link. The first and second vehicles may be aircraft.

One embodiment is a system to establish a free space optical link comprising a first vehicle having at least one conformal panel on an exterior of the first vehicle, the at least one conformal panel comprising at least one RF array, at least one optical detection aperture, and at least one optical beam directing aperture. The system comprises a second vehicle having at least one conformal panel on an exterior of the second vehicle, the at least one conformal panel comprising at least one RF array, at least one optical detection aperture, and at least one optical beam direction aperture, wherein a RF link may be established between the at least one conformal panel of the first vehicle and the at least one conformal panel of the second vehicle, and wherein an optical link may be established between the at least one conformal panel of the first vehicle and the at least one conformal panel of the second vehicle.

The system may comprise a first processor on the first vehicle, the first processor in communication with a virtual 3D model and in communication with the at least one RF array, the at least one optical detection aperture, and the at least one optical beam direction aperture of the at least one conformal panel on the exterior of the first vehicle. The system may comprise a second processor on the second vehicle, the second processor in communication with a virtual 3D model and in communication with the at least one RF array, the at least one optical detection aperture, and the at least one optical beam direction aperture of the at least one conformal panel on the exterior of the second vehicle. Data may be transmitted between the first and second vehicles via the optical link and the RF link. The first and second vehicles may comprise aircraft. The optical detection aperture may comprise a laser light detector and the optical beam directing aperture may comprise an agile beam laser that may be electronically maneuvered by liquid crystals. The at least one conformal panel may comprise a first plurality of conformal panels on the exterior of the first vehicle, and the at least one conformal panel may comprise a second plurality of conformal panels on the exterior of the second vehicle.

One embodiment is an optical link device comprising a conformal panel and at least one RF array on the conformal panel, wherein the RF array is configured to create RF link with a second RF array. The optical link device comprises at least one optical detecting aperture on the conformal panel and at least one optical beam directing aperture on the conformal panel. The optical detecting aperture is configured to detect a laser and the optical beam directing aperture is configured to direct a laser.

The optical beam directing aperture may comprise an agile beam laser that may be electronically maneuvered by liquid crystals. The optical directing aperture may be a plurality of laser light detector positioned about the conformal panel. The RF array, optical detecting aperture, and the optical beam directed aperture may be in communication with a processor.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 1A-7B are directed to the disclosed methods, systems, and apparatus for the disclosed conformal load bearing distributed sensing array (i.e. the electromagnetic (EM) panel), in accordance with at least one embodiment of the present disclosure.

FIGS. 8-10 are directed to the disclosed methods, systems, and apparatus for creating a free space optical link between two vehicles employing the disclosed conformal load bearing distributed sensing array, in accordance with at least one embodiment of the present disclosure.

DESCRIPTION

The methods and apparatus disclosed herein provide an operative system for conformal load bearing distributed sensing arrays (i.e. conformal load bearing distributed sensing aperture arrays). The system of the present disclosure teaches a conformal load bearing distributed sensing array (CL-DSA). The CL-DSA is a multi-functional, multi-spectral panel of apertures that integrates radio frequency (RF) sensors, electro-optical sensors, and/or passive/active lasers into a single conformal load bearing panel.

The CL-DSA employs a single panel to provide a multi-spectral sensor array that is conformal to meet aerodynamic requirements and is structurally integrated such that sensor components are integrated into the structure, thereby minimizing the volume required to integrate the sensors onto the platform of a vehicle. The sensor components are integrated into the single panel such that they are flush-mounted to the surface of the panel. The single panel is used to mount the discrete sensor components onto the vehicle. The components may include RF sensors and emitters, electro-optical sensors, and/or laser emitters. Some of the components may be mounted into the panel via a housing. A plurality of panels may be installed onto the vehicle to provide a wider range of coverage.

The single panel provides a drop-in solution for the sensor array that allows for sensors to be easily installed or replaced. The drop-in solution allows for pre-assembly of the panel (i.e. assembly of the panel to be performed prior to installation of the panel into the vehicle) and also allows for the sensors to be easily removed from the panel so that they can be reworked and/or replaced.

As previously mentioned above, currently, sensor arrays use a mounting system that is not flush with the outer surface of the vehicle, thereby providing a non-aerodynamic surface. Current conventional sensor array structures employ a more difficult to remove and decentralized design that is not conformal to the vehicle.

In one or more embodiments, a system and method for establishing a free space optical link between vehicles that employs the disclosed CL-DSA design is disclosed. It should be noted that a communications link between moving vehicles, such as aircraft, can be difficult to establish in a secure manner. Security of the link may be important if the aircraft are military aircraft. A radio frequency (RF) link can be established, but such a link may be susceptible to interception if a third party happens to scan the frequency being used for the link. An optical link between two moving vehicles, such as aircraft, may be more secure option. However, creating a free space optical link present some challenges due to the movement of the aircraft. The optical beam is much smaller than the beam of an RF link making it more difficult to point the optical beam to the appropriate location on the exterior of an aircraft. Gimbaled optics have been used in the past to point the optical beam, such as a laser, to a platform. However, in order to effectively communicate between both vehicles, both platforms need to use gimbaled optics. The moving parts of gimbaled optics may lead to the gimbaled optics as being unreliable as well as being expensive. Further, it may take significant time durations for the detection, acquiring, and tracking of the vehicles via the movement of the gimbaled optics. Other disadvantages of using gimbaled optics may exist.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to sensing arrays, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIGS. 1A-7B are directed to the disclosed methods, systems, and apparatus for the disclosed conformal load bearing distributed sensing array 100, in accordance with at least one embodiment of the present disclosure.

Figure 1A:
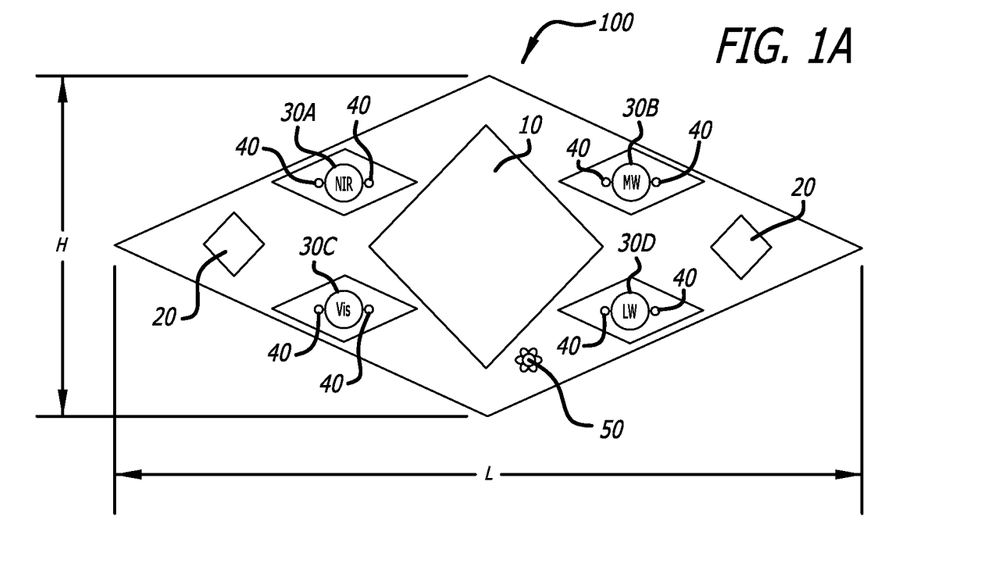
FIG. 1A is a diagram depicting the disclosed conformal load bearing distributed sensing array, in accordance with at least one embodiment of the present disclosure.

FIG. 1A is a diagram depicting the disclosed conformal load bearing distributed sensing array (also referred to as a conformal panel or an electromagnetic (EM) panel) 100, in accordance with at least one embodiment of the present disclosure. In this figure, the conformal panel (i.e. EM panel) 100 is shown to comprise fifteen EM devices (e.g., EM transmitters and/or receivers) 10, 20, 30A-D, 40. It should be noted that in other embodiments, the conformal panel (i.e. EM panel) 100 may include thirteen to seventeen and preferably fifteen EM devices 10, 20, 30A-D, 40, as is shown in FIG. 1A. Additionally, it should be noted that the EM devices 10, 20, 30A-D, 40 may be line replaceable units (LRUs), which can be easily removed from and replaced within the conformal panel (i.e. EM panel) 100, and which may be tested prior to their installation within the conformal panel (i.e. EM panel) 100. In addition, it should be noted that each of the EM devices 10, 20, 30A-D, 40 may comprise a structural housing, which provides rigidity and which may be hermetically sealed.

In a first embodiment, the conformal panel (i.e. EM panel) 100 comprises one radio frequency (RF) array 10 (i.e. a transmitter and/or receiver antenna). Various different types of RF antennas may be employed for the RF array 10 (i.e. transmitter and/or receiver) of the conformal panel (i.e. EM panel) 100 including, but not limited to, an Extremely High Frequency (EHF) band (i.e. EHF-band) active electronically scanned array (AESA) radar aperture, which may be used for transmitting and/or receiving of signals. In other embodiments, the conformal panel (i.e. EM panel) 100 may include more or less than one radio RF array 10 (i.e. transmitter and/or receiver) aperture, as is shown in FIG. 1A, capable of receiving signals over a large spectrum of frequencies below the EHF-band.

Also, the conformal panel (i.e. EM panel) 100 comprises two transmitters 20, which may be lasers (e.g., laser beam directing apertures) or RF transmitting antennas. It should be noted that various different types of transmitters (i.e. transmitter apertures) may be employed for the transmitters 20 of the conformal panel (i.e. EM panel) 100 including, but not limited to, active electronically scanned laser apertures. The conformal panel (i.e. EM panel) 100, in the second embodiment, may include three to four transmitters 20.

In addition, the conformal panel (i.e. EM panel) 100 comprises four receivers 30A-D of a first type, which may be optical sensors (i.e. optical sensor apertures) or RF receiving antennas. Various different types of receivers (i.e. receiver apertures) may be employed for the receivers 30A-D of the conformal panel (i.e. EM panel) 100 including, but not limited to, passive electro-optical imaging sensors (e.g., near infra-red (NIR) sensor 30A, mid-wave (MW) sensor 30B, visible light (VIS) sensor 30C, and long-wave (LW) sensor 30D). In the second embodiment, the conformal panel (i.e. EM panel) 100 may include more or less than four receivers 30A-D (i.e. receiver apertures), as is shown in FIG. 1A, and the additional receiver apertures may include short-wave (SW) receiver apertures.

Additionally, the conformal panel (i.e. EM panel) 100 comprises eight receivers 40 (i.e. receiver apertures) of a second type, which may be optical sensors or RF receiving antennas. It should be noted that various different types of receivers may be employed for the receivers 40 of the conformal panel (i.e. EM panel) 100 including, but not limited to, laser warning/detection apertures. In the second embodiment, the conformal panel (i.e. EM panel) 100 may include more or less than eight receivers 40, as is shown in FIG. 1A.

In addition, the conformal panel (i.e. EM panel) 100 is shown to comprise a precision clock 50, which may be used for synchronization of the conformal panel (i.e. EM panel) 100 to other devices (e.g., to other conformal panels (i.e. EM panels) 100). Various different types of clocks may be employed for the precision clock 50 of the conformal panel (i.e. EM panel) 100 including, but not limited to, an atomic clock.

Prior to normal operation of the conformal panel (i.e. EM panel) 100, the EM devices 10, 20, 30A-D, 40 as well as the precision clock 50 are tested prior to being installed within the conformal panel (i.e. EM panel) 100 and/or tested after they are installed within the conformal panel (i.e. EM panel) 100. The conformal panel (i.e. EM panel) 100 is designed and manufactured to be a replaceable single unit. After the EM devices 10, 20, 30A-D, 40 and the precision clock 50 are installed into the conformal panel (i.e. EM panel) 100, the conformal panel (i.e. EM panel) 100 is installed into a vehicle. The conformal panel (i.e. EM panel) 100 is disposed conformally within an opening of the exterior surface of the vehicle such that that conformal panel (i.e. EM panel) 100 is flush with the exterior surface of the vehicle (e.g., refer to FIG. 8, which shows the conformal panel (i.e. EM panel) 100 disposed within the exterior surface of vehicles 800A, 800B). It should be noted that the conformal panel (i.e. EM panel) 100 may be installed into various different types of vehicles including, but not limited to, airborne vehicles (e.g., aircraft), terrestrial vehicles (e.g., tanks), and marine vehicles (e.g., military ships). After installation of the conformal panel (i.e. EM panel) 100 into a vehicle, during normal operation of the conformal panel (i.e. EM panel) 100, the receivers 10, 30A-D, 40 receive at least one first signal (e.g., an EM signal(s)), and the transmitters 10, 20 transmit at least one second signal (e.g., an EM signal(s)).

In FIG. 1A, the conformal panel (i.e. EM panel) 100 is depicted as being manufactured to be in a diamond shape. It should be noted that in other embodiments, the conformal panel (i.e. EM panel) 100 may be manufactured to be in other shapes other than a diamond shape including, but not limited to, regular shapes (e.g., square, rectangle, circle, oval, triangle, and polygon) and irregular shapes (e.g., freeform shapes).

Figure 1B:
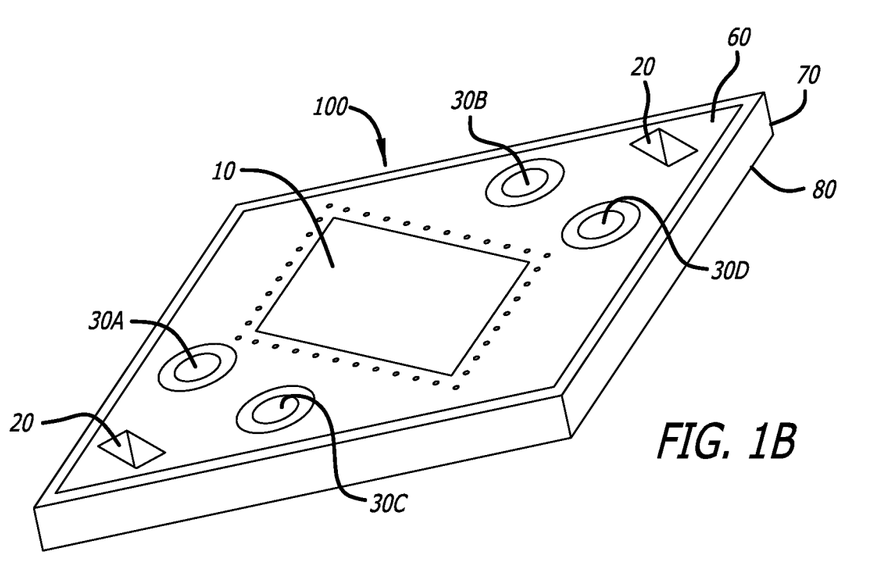
FIG. 1B is another diagram showing the disclosed conformal load bearing distributed sensing array, in accordance with at least one embodiment of the present disclosure.

FIG. 1B is another diagram showing the disclosed conformal load bearing distributed sensing array (also referred to as a conformal panel or an EM panel) 100, in accordance with at least one embodiment of the present disclosure. In this figure, the conformal panel (i.e. EM panel) 100 is shown to include an outer skin 60, and inner skin 80, and a core 70. The core 70 is disposed between the outer skin 60 and the inner skin 80. In some embodiments, the core 70 of the conformal panel is manufactured via three-dimensional (3D) printing. It should be noted that the EM devices 10, 20, 30A-D, 40 are installed and disposed within openings on the outer skin 60 of the conformal panel (i.e. EM panel) 100.

Figure 2A:
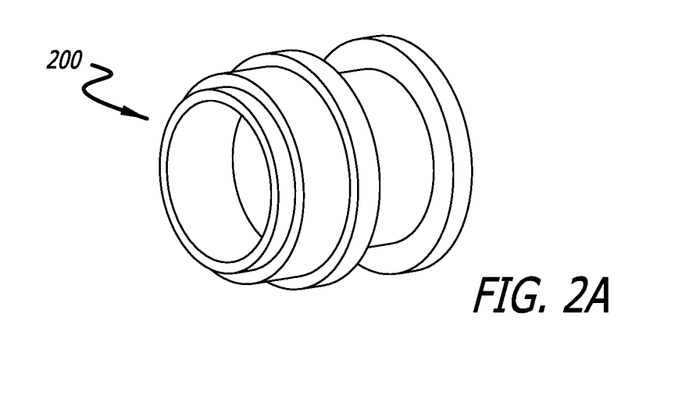
FIG. 2A is diagram illustrating an exemplary optical lens unit that may be employed by the disclosed conformal load bearing distributed sensing array, in accordance with at least one embodiment of the present disclosure.

FIG. 2A is diagram illustrating an exemplary optical lens unit 200 that may be employed by the disclosed conformal load bearing distributed sensing array (also referred to as a conformal panel or an EM panel) 100, in accordance with at least one embodiment of the present disclosure. The optical lens unit 200 may be employed for at least one of the four receivers 30A-D of the conformal panel (i.e. EM panel) 100. The optical lens unit 200 may be a line replaceable unit (LRU), which can be easily removed from and replaced within the conformal panel (i.e. EM panel) 100. The optical lens unit 200 may be tested prior to its installation within the conformal panel (i.e. EM panel) 100. In some embodiments, the optical lens unit 200 may be a commercial off the shelf unit (COTS), which is a commercially available unit.

Figure 2B:
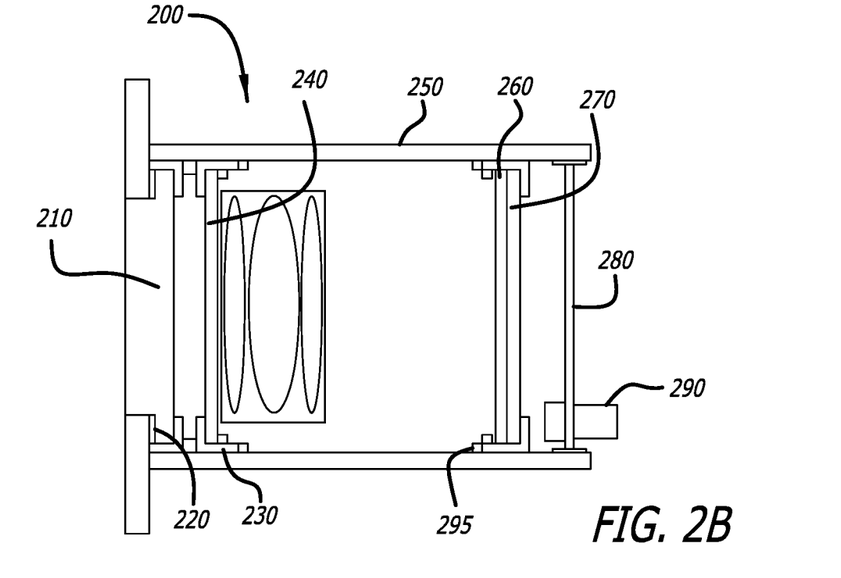
FIG. 2B is diagram showing a cross-sectional view of the exemplary optical lens unit of FIG. 2A, in accordance with at least one embodiment of the present disclosure.

FIG. 2B is diagram 205 showing a cross-sectional view of the exemplary optical lens unit 200 of FIG. 2A, in accordance with at least one embodiment of the present disclosure. In this figure, the optical lens unit 200 is shown to comprise a seal 220 and ring spacer 230 disposed between a window 210 and a filter 240. In addition, the optical lens unit 200 is shown to comprise a lock ring 295 locking a focal plane array 260 and a readout integrated circuit (ROIC) 270. Additionally, the optical lens unit 200 is shown to comprise a structural housing 250 and a closeout 280, which are structurally rigid and are hermetically sealed. A connector 290 is shown to be connected to the closeout 280 of the optical lens unit 200.

The optical components (e.g., window 210, filter 240, focal plane array 260, and ROIC 270) are fixed relative to one another within the structural housing 250. The structural housing 250 is internally threaded and comprises internal support fittings to accurately locate and affix the optical components (e.g. 210, 240, 260, 270) within the structural housing 250.

Figure 3A:
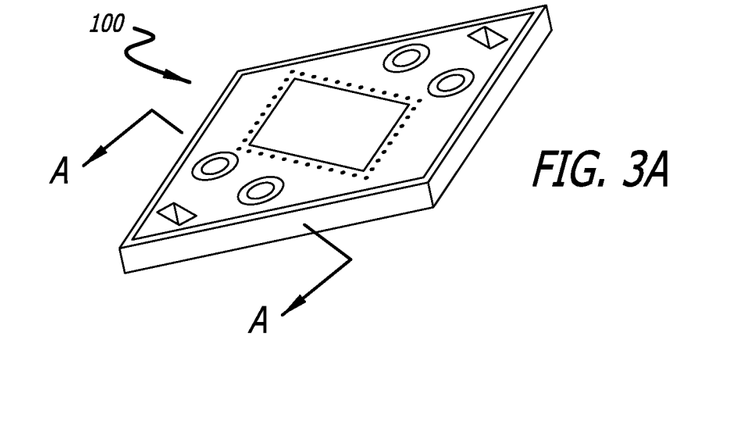
FIG. 3A is a diagram showing the disclosed conformal load bearing distributed sensing array, in accordance with at least one embodiment of the present disclosure.

FIG. 3A is a diagram 300 showing the disclosed conformal load bearing distributed sensing array (also referred to as a conformal panel or an EM panel) 100, in accordance with at least one embodiment of the present disclosure.

Figure 3B:
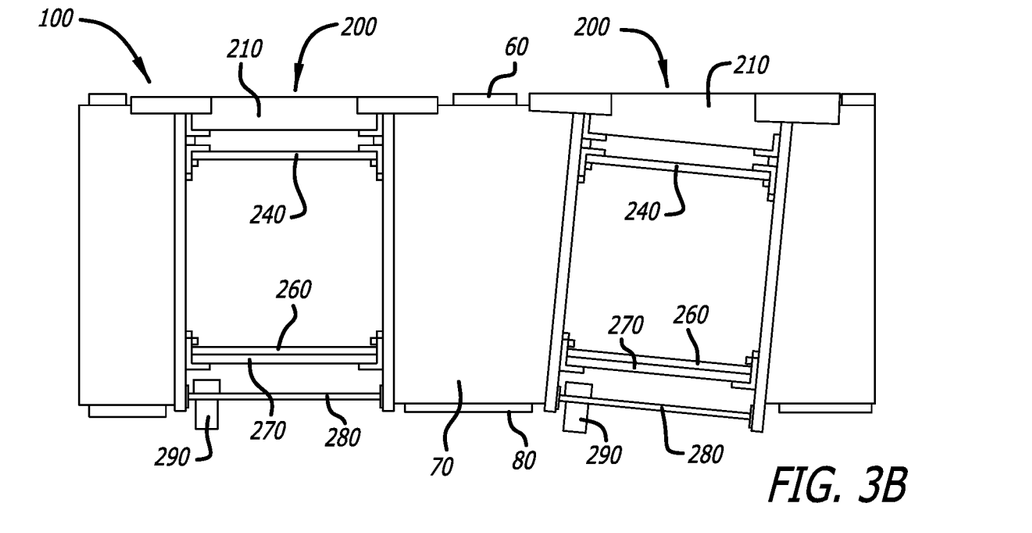
FIG. 3B is a diagram illustrating a cross-sectional view of a portion of the disclosed conformal load bearing distributed sensing array, in accordance with at least one embodiment of the present disclosure.

FIG. 3B is a diagram 310 illustrating a cross-sectional view of a portion (refer to the "a" arrows of FIG. 3A) of the disclosed conformal load bearing distributed sensing array (also referred to as a conformal panel or an EM panel) 100, in accordance with at least one embodiment of the present disclosure. In this figure, the conformal panel is shown to comprise an outer skin 60, and inner skin 80, and a core 70, which is disposed between the outer skin 60 and the inner skin 80. The outer skin 60 and inner skin 80 are bonded to the core 70 and provide stiffness to the conformal panel (i.e. EM panel) 100.

In some embodiments, the core 70 of the conformal panel (i.e. EM panel) 100 is manufactured via three-dimensional (3D) printing. The 3D printed core 70 allows for the integration of various different types of EM devices (e.g., 10, 20, 30A-D, 40 of FIG. 1A) into the conformal panel (i.e. EM panel) 100. The 3D printed core also allows for the tilting of the line replaceable units (LRUs) (e.g., EM devices 10, 20, 30A-D, 40) to provide for improved coverage area for the transmission and receiving of signals. Specifically, in FIG. 3B, two optical lens units 200 are shown to be installed within the conformal panel (i.e. EM panel) 100 and, in particular, the right optical lens unit 200 is shown to be installed on a tilt within the conformal panel.

Figure 3C:
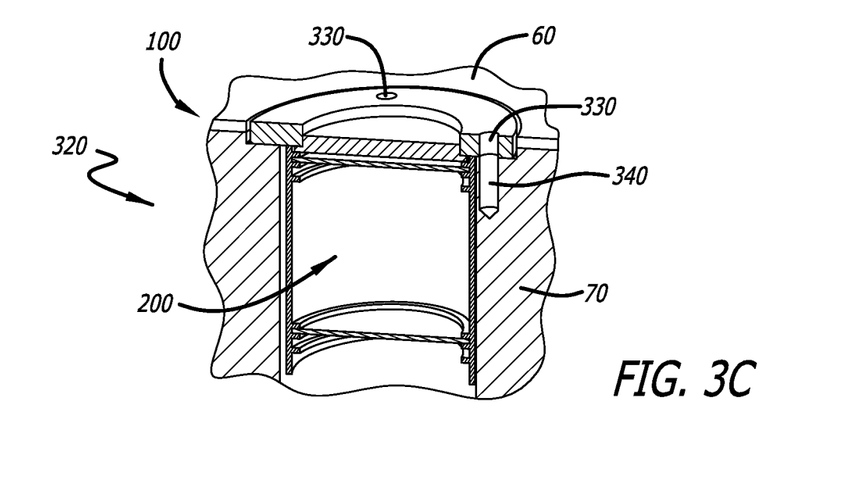
FIG. 3C is a diagram depicting a cross-sectional view of another portion of the disclosed conformal load bearing distributed sensing array, in accordance with at least one embodiment of the present disclosure.

FIG. 3C is a diagram 320 depicting a cross-sectional view of another portion of the disclosed conformal load bearing distributed sensing array (also referred to as a conformal panel or an EM panel), in accordance with at least one embodiment of the present disclosure. In this figure, an optical lens unit 200 is shown to be installed within the conformal panel (i.e. EM panel) 100. Specifically, the optical lens unit 200 is shown to be disposed within the outer skin 60 of the conformal panel (i.e. EM panel) 100. Also, the optical lens unit 200 is shown to be installed within the conformal panel (i.e. EM panel) 100 via fasteners 330 and potted threaded inserts 340, which are located within the core 70.

Figures 4A, 4B:
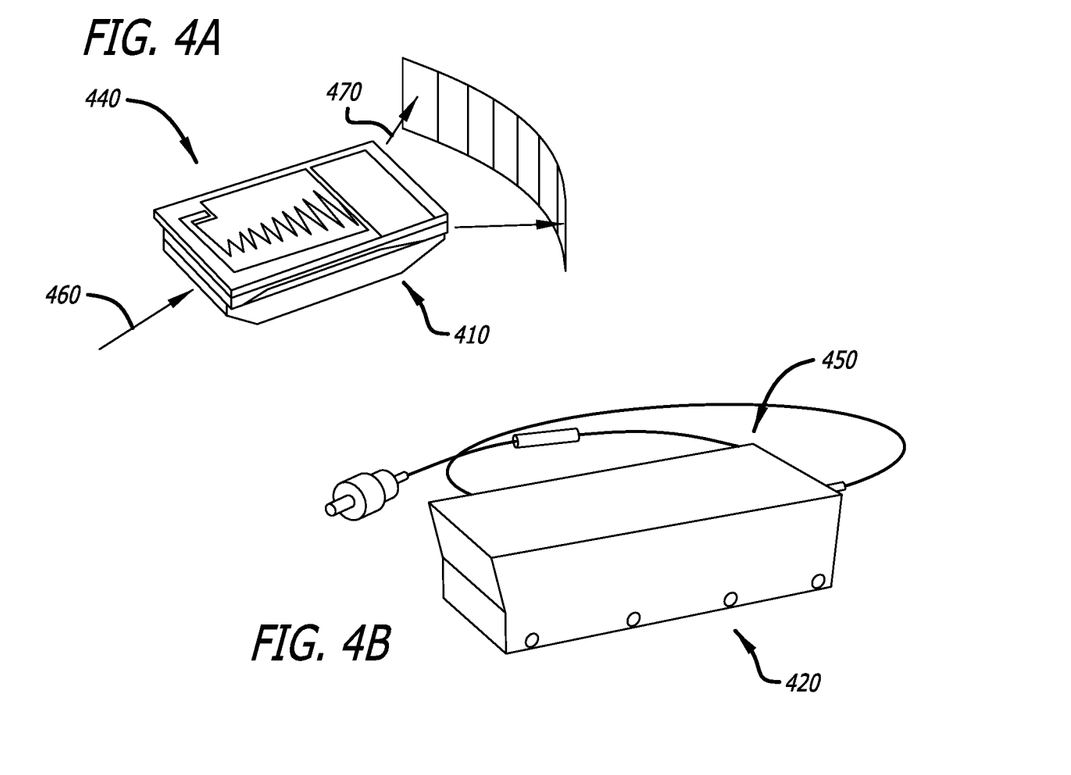
FIG. 4A is a diagram showing an exemplary laser that may be employed by the disclosed conformal load bearing distributed sensing array, in accordance with at least one embodiment of the present disclosure.
FIG. 4B is a diagram showing a laser manufactured by Vescent Photonics that may be employed by the disclosed conformal load bearing distributed sensing array, in accordance with at least one embodiment of the present disclosure.

FIG. 4A is a diagram 410 showing an exemplary laser 440 that may be employed by the disclosed conformal load bearing distributed sensing array (also referred to as a conformal panel or an EM panel) 100, in accordance with at least one embodiment of the present disclosure. The laser 440 may be employed for at least one of the two transmitters 20 of the conformal panel (i.e. EM panel) 100. The laser 440 may be a LRU, which can be easily removed from and replaced within the conformal panel (i.e. EM panel) 100. The laser 440 may be tested prior to its installation within the conformal panel (i.e. EM panel) 100. In some embodiments, the laser 440 may be a COTS, which is a commercially available unit. In this figure, the laser 440 is shown to receive an optical input 460 and to transmit a voltage-steerable optical output 470.

FIG. 4B is a diagram 420 showing a laser 450 manufactured by Vescent Photonics that may be employed by the disclosed conformal load bearing distributed sensing array (also referred to as a conformal panel or an EM panel) 100, in accordance with at least one embodiment of the present disclosure. This laser 450 is a COTS unit that is a LRU. This particular laser 450 employs non-mechanical beam steering with, e.g., a thirty (30) degrees by (x) 5 (5) degrees field of view (FOV).

Figure 4C:
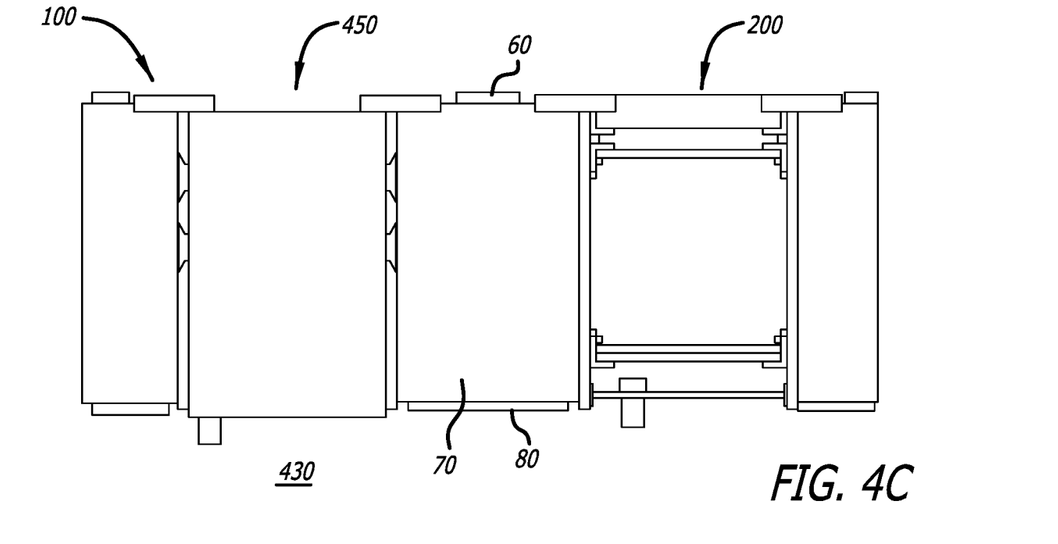
FIG. 4C is a diagram showing a cross-sectional view of a portion of the disclosed conformal load bearing distributed sensing array employing the laser of FIG. 4B, in accordance with at least one embodiment of the present disclosure.

FIG. 4C is a diagram 430 showing a cross-sectional view of a portion of the disclosed conformal load bearing distributed sensing array (also referred to as a conformal panel or an EM panel) 100 employing the laser 450 of FIG. 4B, in accordance with at least one embodiment of the present disclosure. In this figure, the laser 450 and an optical lens unit 200 are shown to be installed within the conformal panel (i.e. EM panel) 100. Specifically, the laser 450 and the optical lens unit 200 are both shown to be disposed within the outer skin 60 of the conformal panel (i.e. EM panel) 100.

Figure 5A:
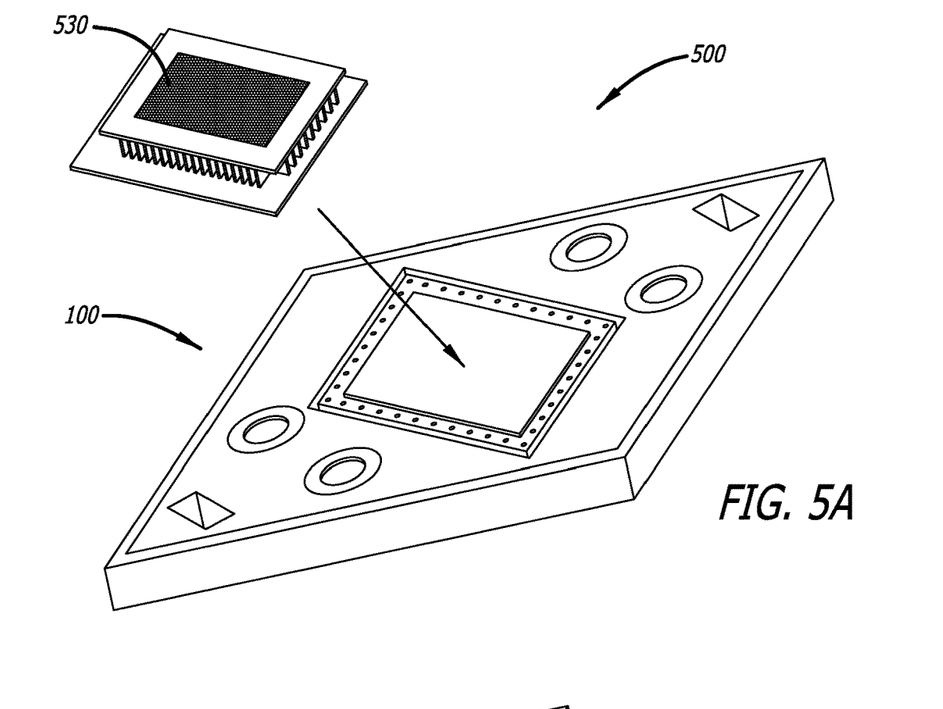
FIG. 5A is a diagram depicting an exemplary phased array antenna that may be employed by the disclosed conformal load bearing distributed sensing array, in accordance with at least one embodiment of the present disclosure.

FIG. 5A is a diagram 500 depicting an exemplary phased array antenna 530 that may be employed by the disclosed conformal load bearing distributed sensing array (also referred to as a conformal panel or an EM panel) 100, in accordance with at least one embodiment of the present disclosure. The phased array antenna 530 may be employed for the RF array 10 (i.e. a transmitter and/or receiver antenna) of the conformal panel (i.e. EM panel) 100. The phased array antenna 530 may transmit and/or receive signals. The phased array antenna 530 may be a LRU, which can be easily removed and replaced within the conformal panel (i.e. EM panel) 100. The phased array antenna 530 may be tested prior to its installation within the conformal panel (i.e. EM panel) 100. In at least one embodiment, the phased array antenna 530 may be a COTS, which is a commercially available unit.

Figure 5B:
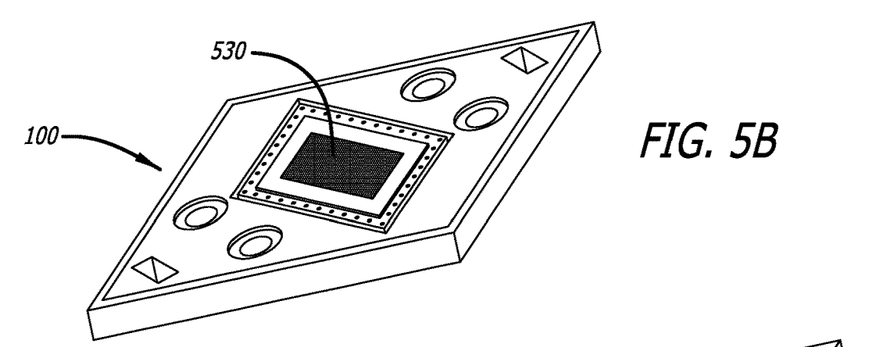
FIG. 5B is a diagram depicting the disclosed conformal load bearing distributed sensing array employing the phased array antenna of FIG. 5A, in accordance with at least one embodiment of the present disclosure.

FIG. 5B is a diagram 510 depicting the disclosed conformal load bearing distributed sensing array (also referred to as a conformal panel or an EM panel) 100 employing the phased array antenna 530 of FIG. 5A, in accordance with at least one embodiment of the present disclosure.

Figure 5C:
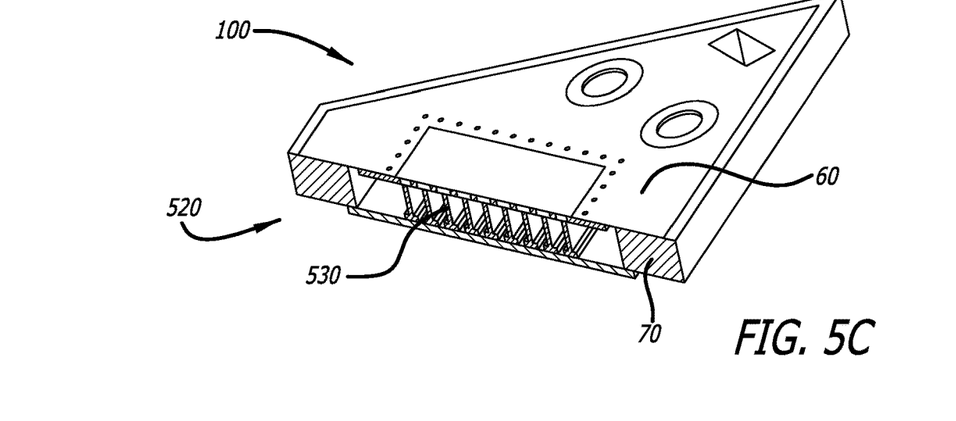
FIG. 5C is a diagram showing a cross-sectional view of a portion of the disclosed conformal load bearing distributed sensing array employing the phased array antenna of FIG. 5A, in accordance with at least one embodiment of the present disclosure.

FIG. 5C is a diagram 520 showing a cross-sectional view of a portion of the disclosed conformal load bearing distributed sensing array (also referred to as a conformal panel or an EM panel) 100 employing the phased array antenna 530 of FIG. 5A, in accordance with at least one embodiment of the present disclosure. In this figure, the phased array antenna 530 is shown to be installed within the conformal panel (i.e. EM panel) 100. In particular, the phased array antenna 530 is shown to be disposed within the outer skin 60 of the conformal panel (i.e. EM panel) 100.

Figure 6A:
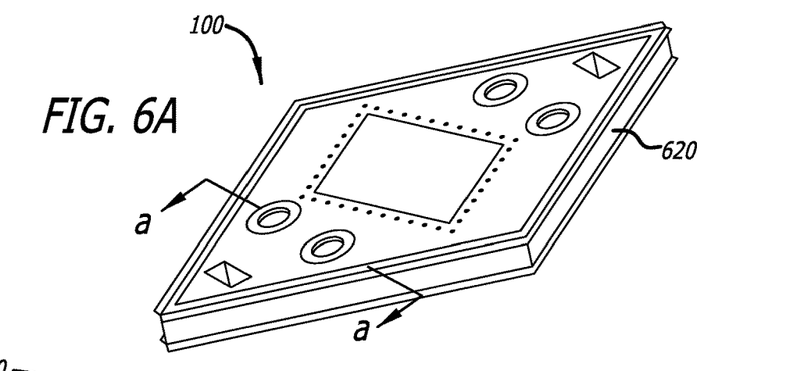
FIG. 6A is a diagram depicting the disclosed conformal load bearing distributed sensing array employing a structural frame, in accordance with at least one embodiment of the present disclosure.

FIG. 6A is a diagram 600 depicting the disclosed conformal load bearing distributed sensing array (also referred to as a conformal panel or an EM panel) 100 employing a structural frame 620, in accordance with at least one embodiment of the present disclosure. The structural frame 620 is shown to wrap around and cover the perimeter (e.g., perimeter sides) of the conformal panel (i.e. EM panel) 100. When the conformal panel (i.e. EM panel) 100 is installed within a vehicle (e.g., refer to FIG. 8, which shows the conformal panel (i.e. EM panel) 100 disposed within the exterior surface of vehicles 800A, 800B), the conformal panel (i.e. EM panel) 100 is integrated within the substructure of the vehicle, and the structural frame 620 ties into the internal frame(s) and/or rib(s) of the vehicle.

Figure 6B:
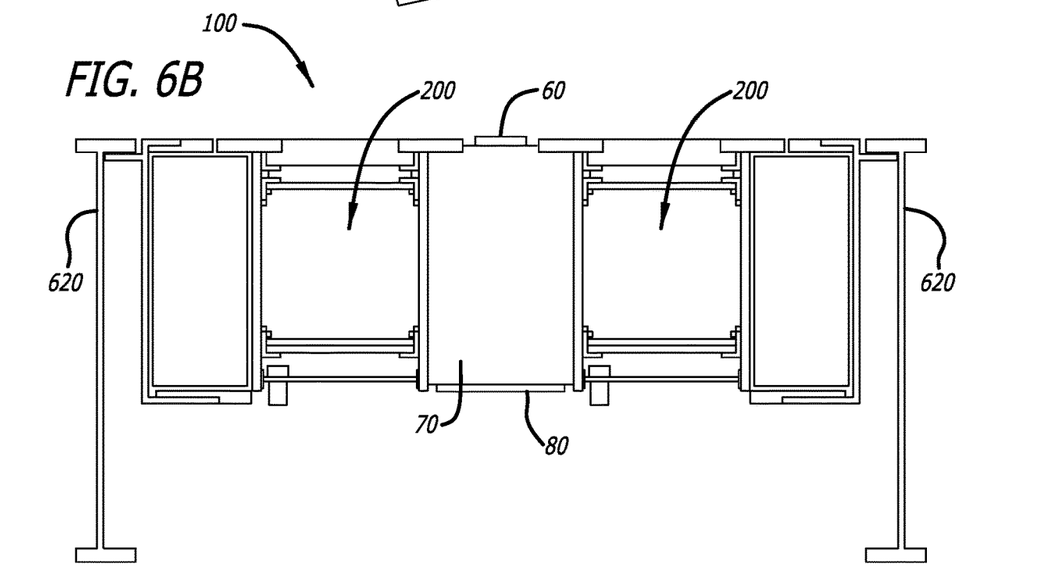
FIG. 6B is a diagram showing a cross-sectional view of a portion of the disclosed conformal load bearing distributed sensing array employing the structural frame of FIG. 6A, in accordance with at least one embodiment of the present disclosure.

FIG. 6B is a diagram 610 showing a cross-sectional view of a portion (refer to the "a" arrows of FIG. 6A) of the disclosed conformal load bearing distributed sensing array (also referred to as a conformal panel or an EM panel) 100 employing the structural frame 620 of FIG. 6A, in accordance with at least one embodiment of the present disclosure. In this figure, the structural frame 620 is shown at the perimeter sides of the conformal panel (i.e. EM panel) 100. Also shown are two optical lens units 200 installed within the conformal panel (i.e. EM panel) 100. The optical lens units 200 are shown to be disposed within the outer skin 60 of the conformal panel (i.e. EM panel) 100.

Figure 7A:
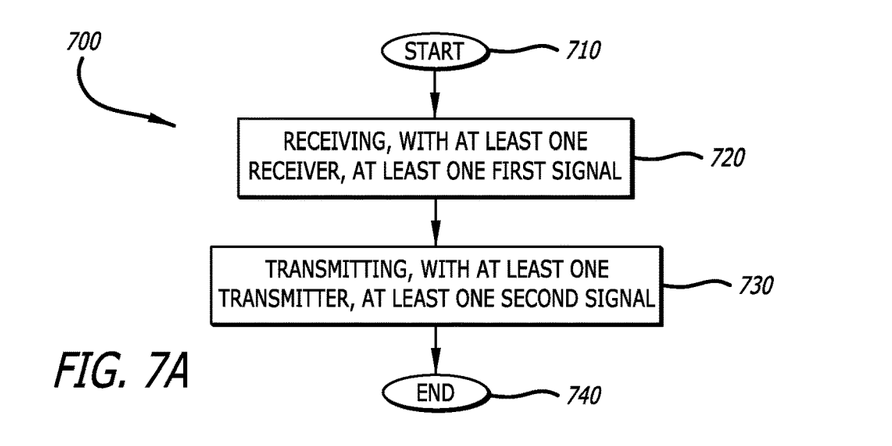
FIG. 7A is a diagram showing a flow chart for the disclosed method for operation of the disclosed conformal load bearing distributed sensing array, in accordance with at least one embodiment of the present disclosure.

FIG. 7A is a diagram showing a flow chart for the disclosed method 700 for operation of the disclosed conformal load bearing distributed sensing array (also referred to as a conformal panel or an EM panel), in accordance with at least one embodiment of the present disclosure. At the start 710 of the method 700, at least one receiver (e.g., EM devices 10, 30A-D, 40 of FIG. 1A) receives at least one first signal 720. At least one transmitter (e.g., EM devices 10, 20 of FIG. 1A) transmits at least one second signal 730. Then, the method 700 ends 740.

Figure 7B:
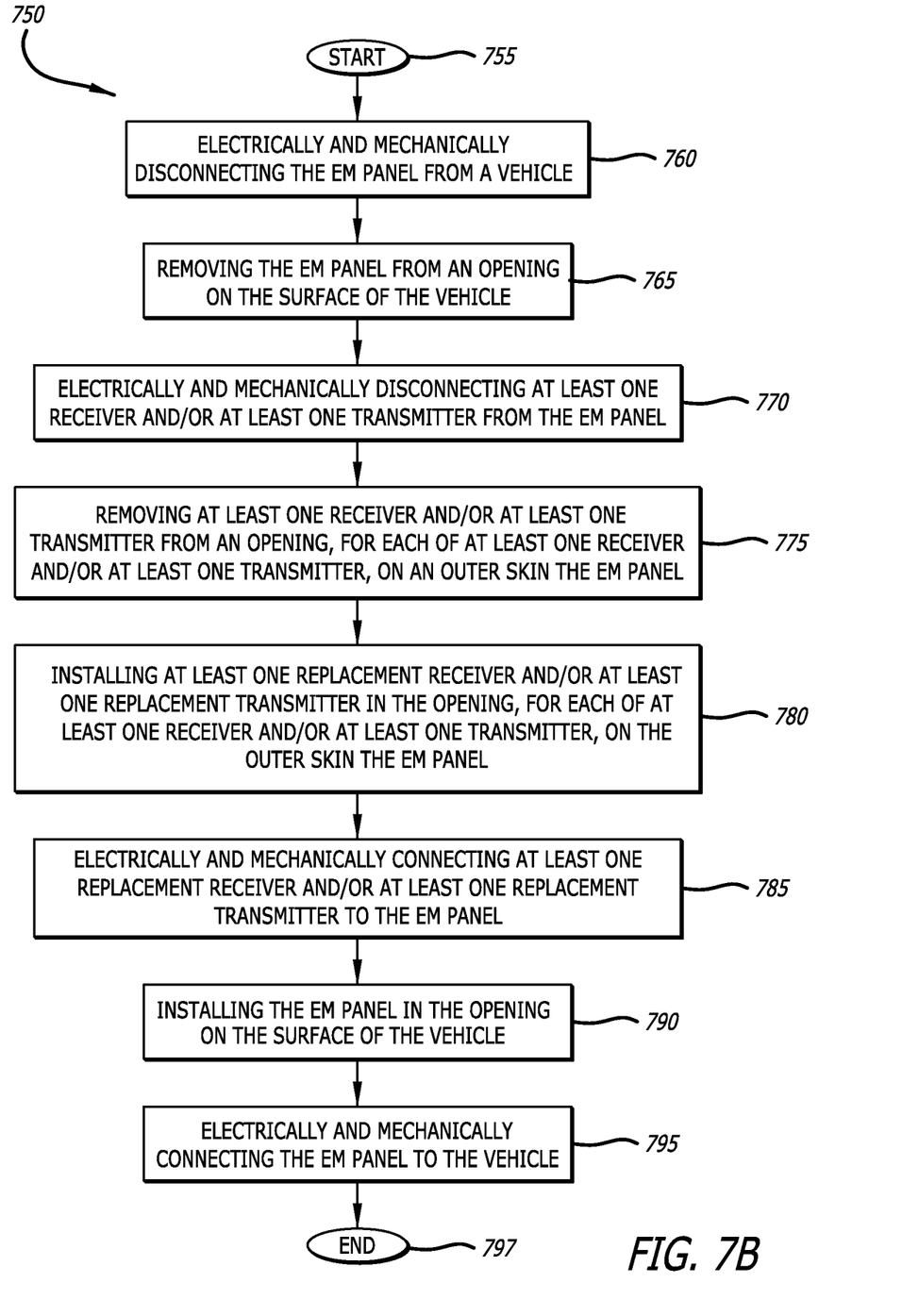
FIG. 7B is a diagram showing a flow chart for the disclosed method for repairing the disclosed conformal load bearing distributed sensing array, in accordance with at least one embodiment of the present disclosure.

FIG. 7B is a diagram showing a flow chart for the disclosed method 750 for repairing the disclosed conformal load bearing distributed sensing array (also referred to as a conformal panel or an EM panel), in accordance with at least one embodiment of the present disclosure. At the start 755 of the method 750, the EM panel is electrically and mechanically disconnected from a vehicle, where the EM panel is disposed within an opening on a surface of the vehicle such that the EM panel is flush with the surface 760. Then, the EM panel is removed from the opening on the surface of the vehicle 765. At least one receiver, which is not working properly, and/or at least one transmitter, which is not working properly, is electrically and mechanically disconnected from the EM panel 770. At least one receiver, which is not working properly, and/or at least one transmitter, which is not working properly, is removed from an opening, for each of at least one receiver and/or at least one transmitter, on an outer skin the EM panel 775. At least one replacement receiver and/or at least one replacement transmitter is installed in the opening, for each of at least one receiver and/or at least one transmitter, on the outer skin the EM panel 780. Also, at least one replacement receiver and/or the at least one replacement transmitter is electrically and mechanically connected to the EM panel 785. In addition, the EM panel is installed in the opening on the surface of the vehicle 790. Also, the EM panel is electrically and mechanically connected to the vehicle 795. Then, the method 750 ends.

Figure 8:
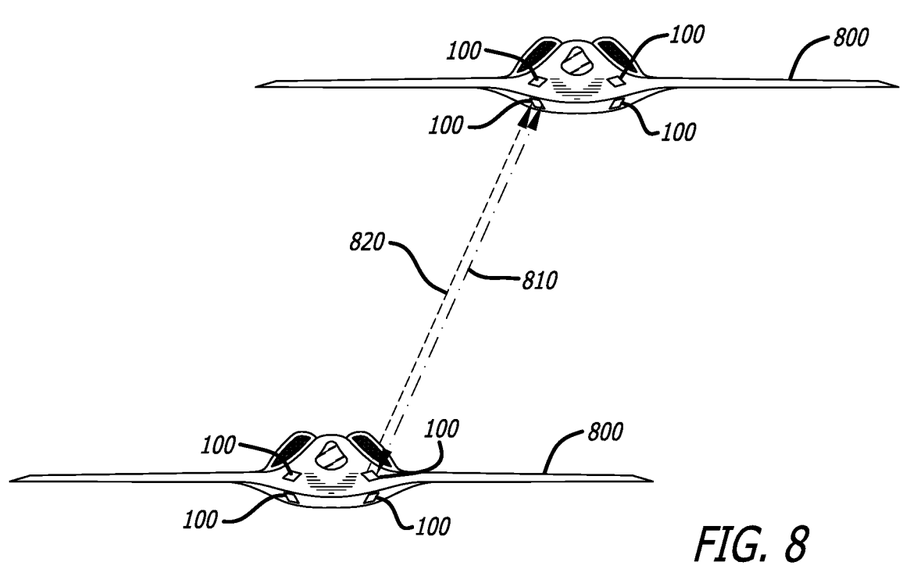
FIG. 8 is schematic of one embodiment of a system for creating a free space optical link between two vehicles.
Figure 9:
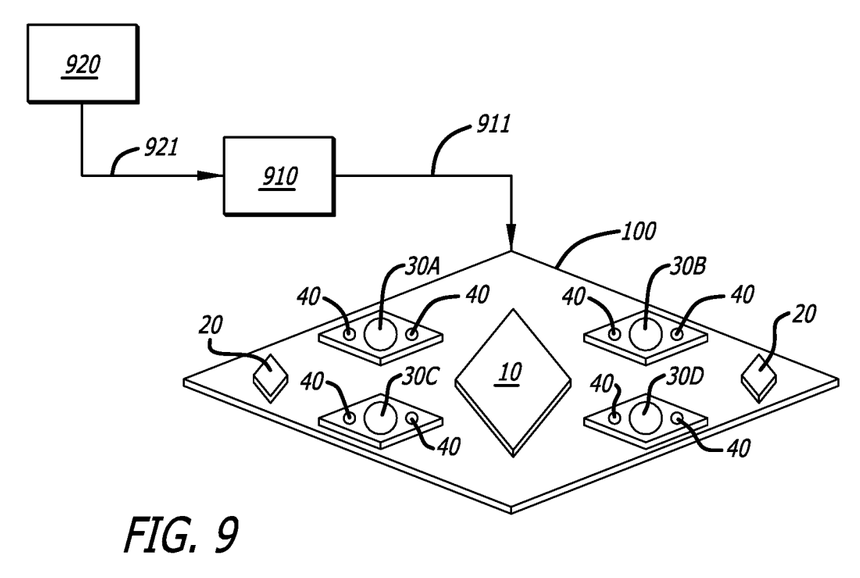
FIG. 9 shows one embodiment of a conformal panel that may be used to create a free space optical link between two vehicles.
Figure 10:
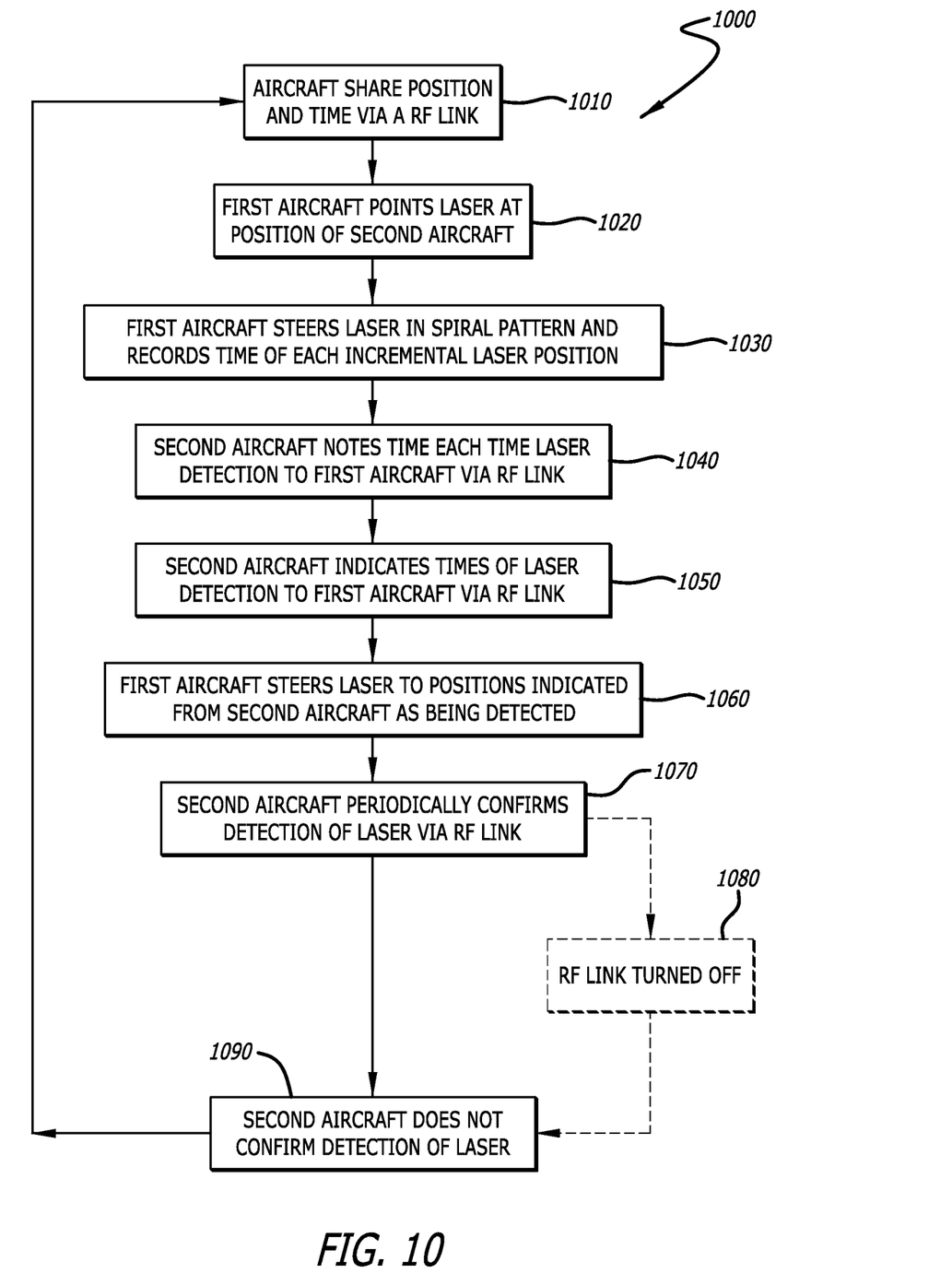
FIG. 10 is flow chart of one embodiment of a method of establishing a free space optical link.

FIGS. 8-10 are directed to the disclosed methods, systems, and apparatus for creating a free space optical link 820 between two vehicles 800A, 800B employing the disclosed conformal load bearing distributed sensing array (i.e. EM panel) 100, in accordance with at least one embodiment of the present disclosure.

FIG. 8 is schematic of one embodiment of a system for creating a free space optical link 820 between two vehicles. FIG. 8 shows two vehicles, aircraft 800A and aircraft 800B, that have created a free space optical link 820 (e.g., via a laser) between the aircraft 800A and 800B. As discussed herein, a radio frequency (RF) link 810 has first been created between the aircraft 800A and 800B. Prior to establishing the RF link 810, the vehicles 800A and 800B have synchronized clocks between the two vehicles 800A and 800B. The synchronization of clocks may be very precise. For example, the clocks on the two vehicles 800A and 800B may be synchronized together having an accuracy precise to one billionth of a second. The RF link 810 may be easier to establish between two moving vehicles, such as aircraft 800A and aircraft 800B, than an optical link 820 between two moving vehicles as would be appreciated by one of ordinary skill in the art having the benefit of this disclosure. Once the RF link 810 has been established, information may be transmitted along the RF link 810 to help establish an optical link 820 between the moving aircraft 800A and 800B, as discussed herein.

The exterior of each vehicle 800A and 800B may include a plurality of conformal panels 100 (e.g., the disclosed conformal load bearing distributed sensing array 100 of FIG. 1A) (i.e. EM panel). An RF link 810 may be created between panels 100 on the two vehicles 800A and 800B. A laser 820 may then be pointed from one vehicle towards the other vehicle, as shown in FIG. 8 as the optical link 820 extending from a first aircraft 800A to a second aircraft 800B. The first aircraft 800A may then begin to move the laser 820 in a pattern and track the different positions of the laser 820 as well as recoding the time at which the laser 820 was moved to the different positions along the pattern. The pattern may be spiral pattern. The panels 100 on the exterior of the second aircraft 800B may detect the laser 820 at various positions as it is rotated through the spiral pattern.

The second aircraft 800B may then transmit the various times at which the panels 100 detected the laser 820 to the first aircraft 800A over the RF link 810. Upon receipt of the synchronized detection times from the second aircraft 800B, the first aircraft 800A may reposition the laser 820 to only those positions that were detected by the panels 100 on the second aircraft 800B. The second aircraft 800B may confirm re-detection of the laser 820 by the panels 100 on the exterior of the aircraft 800B and transfer the confirmation over the RF link 810 to the first aircraft 800A. At this point, the optical link 820 between the two vehicles (i.e. aircraft) 800A and 800B is established and information may be transferred along the optical link 820 as desired. Either vehicle 800A or 800B may terminate the RF link 810 once it is confirmed that the optical link 820 has been established using the optical link 820 as the sole means of transmitting information between the two vehicles 800A and 800B until the optical link 820 is broken. Upon breaking the optical link 820, the RF link 810 can be re-established if a new optical link 820 between the two vehicles 800A and 800B is desired. The direction between established the RF link 810 and optical link 820 is shown in regard to FIG. 8 for illustrative purposes only. For example, the laser 820 could originate at the second vehicle (i.e. aircraft) 800B and be pointed to the first vehicle (i.e. aircraft) 800A as would be appreciated by one of ordinary skill in the art having the benefit of this disclosure. The number and location of panels 100 on the exterior of the aircraft 800A and 800B is for illustrative purposes only and may be varied depending on the application as would be appreciated by one of ordinary skill in the art having the benefit of this disclosure.

FIG. 9 shows one embodiment of a conformal panel (i.e. EM panel) 100 that may be used on the exterior of a vehicle, such as an aircraft 800A, 800B, to create a free space optical link as discussed herein. The panel 100 includes an active electronic scanner RF array 10 that permits two panels to establish a RF link 810 (shown in FIG. 8) between two vehicles. The RF array 10 may support point-to-point radar measurements and other RF interactions such as communications as would be appreciated by one of ordinary skill in the art having the benefit of this disclosure.

The panel 100 may include a plurality of optical beam directing apertures (i.e. transmitters) 20. The optical beam directing apertures 20 may be an agile beam laser and the number and locations of the optical beam directing apertures 20 is shown for illustrative purposes only and may be varied as would be appreciated by one of ordinary skill in the art having the benefit of this disclosure. The optical beam directing apertures 20 may comprise a conformal electronically scanned laser beam director that point beams of photons supplied by onboard lasers installed remote to the panel 100. The optical beam directing apertures 20 may comprise an agile beam laser that may be electronically maneuvered via liquid crystals. The panel 100 could include other mechanisms that may be used to maneuver the optical beam as would be appreciated by one of ordinary skill in the art having the benefit of this disclosure. The optical beam directing apertures 20 are configured to move a laser beam in a spiral pattern through a number of discrete positions. As discussed herein, the time is measured and recorded as the laser is positioned in each discrete position along the pattern and this information may be transmitted via a RF link between two moving vehicles.

The panel 100 may include a plurality of optical devices (i.e. receivers) 30A, 30B, 30C, and 30D and a plurality of optical detection apertures (i.e. receivers) 40. The optical devices 30A, 30B, 30C, and 30D, collectively referred to as 30, may be various types of cameras, and the optical detection apertures 40 may be laser light detectors. A pair of optical detection apertures 40 may be paired with each optical device 30 and may be used to detect a laser guided from another vehicle. The number, configuration, and type of optical devices 30 and optical detection apertures 40 may be varied on the panel 100 as would be appreciated by one of ordinary skill in the art having the benefit of this disclosure. Various optical devices 30 may be included on the panel 100 as would be appreciated by one or ordinary skill in the art having the benefit of this disclosure. For example, one optical device 30 may be configured to decode pixels to determine information being transmitted over an optical link from a vehicle.

Each panel 100 on an exterior of a vehicle may be connected to a central processor 910 via a communication link 911. The communication link 911 may be wireless or could be various wired configurations. For example, the communication link 911 may comprise a high-bandwidth photonic interface composed fiber-optic cable. Each panel 100 may communicate multiple types of information to the processor 910. For example, the panel 100 may communicate precision time references, sensing reference information, and optical aperture information. The central processor 910 may also be in communication via communication link 921 with a database 920 that contains a virtual 3D model. The communication link 921 may be wireless or could be various wired configurations. The virtual 3D model may be used for each vehicle to determine its position as it moves with this information being relayed to another moving vehicle. This information may be used to inform a vehicle to a location to direct a RF link to initially establish a RF link between the two vehicles. While the location from the database may be sufficient to establish a RF link between the two vehicles, an optical link may be too difficult to establish solely based on this positional information due to the continued movement of the two vehicles.

The virtual 3D model may be a virtual two dimensional image tightly integrated with a virtual elevation model. Thus, a point or location within the virtual 3D model may then be located in three dimensions. When a beam from the panel 100 is pointed at locations on the real world surface based upon the vehicle's perception of its location relative to the virtual 3D model, the collected return signals reflected by the real world should match predictions using the virtual 3D model. Multiple measurements using multiple beam positions over time may be exploited to search out match errors that imply errors in the vehicle's perception of its 3D location relative to the virtual 3D model. These periodic measurements may provide update aiding of the vehicle's inertial navigation system in lieu of GPS aiding.

Each panel 100 may synchronize information output from the sensing apertures with precision time references. This information may be continuously streamed in parallel between each panel 100 and the processor 910. The processor 910 may synchronize the information received for each panel 100. The time synchronization information is preserved and exploited to precisely associate panel aperture sensed information with panel sensed motion information and the panel precision time referenced system. Each vehicle may include an atomic clock that is synchronized to the official source of time for the Department of Defense (DoD). Before the vehicles leave on a mission the clocks are all synchronized to DoD time to ensure the exchange of time stamped information between vehicles will be synchronized. The clocks on the various vehicles may be calibrated or synchronized together to a precision of a picosecond.

Another approach to synchronizing the clocks is to create a network of the vehicles involved in a mission. All of the clocks of the vehicles involved in a mission are synchronized to clock of the lead vehicle on the mission. The lead vehicle may periodically measure the difference between each of the vehicle's master DoD time reference and the lead vehicle's master DoD time reference. A calibration table may then be created for each of the periodic measured differences, which may be communicated back to the vehicle with the corresponding difference.

Each panel 100 may communicate various types of information over a high-bandwidth photonic interface composed of fiber-optic cables. For example, the information may include panel precision time references system, panel motion sensing reference system, and the panel sensing apertures interface. The data output from the panel sensing apertures is time synchronized onboard the panel 100 with information output from the panel 100 with precision time references.

FIG. 10 is flow chart of one embodiment of a method 1000 of establishing a free space optical link. At the start of the method 1000, aircraft (i.e. a first aircraft and a second aircraft) share position and time information via a RF link 1010. Then, the first aircraft points a laser at the position of the second aircraft 1020. The first aircraft then steers the laser in a spiral pattern and records the time of each incremental laser position 1030. The second aircraft then notes the time each time the laser from the first aircraft is detected 1040. Then, the second aircraft indicates the time of the laser detection to the first aircraft via the RF link 1050. The first aircraft then steers the laser to positions indicated from the second aircraft as being detected 1060. The second aircraft periodically confirms detection of the laser via the RF link 1070. The RF link is turned off 1080. If the second aircraft does not confirm detection of the laser 1090, then the method 1000 proceeds to step 1010 and the method 1000 repeats accordingly.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve an application or algorithm (e.g., a synchronization program(s)), which may be run on a processor(s) (e.g., central processor 910). The application or algorithm may be a stand alone application, which may contain one or more programs, or that is part of another system or program.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. An electromagnetic (EM) panel for an aircraft, the panel comprising:
   an outer skin;
   an inner skin;
   a core disposed between the outer skin and the inner skin; and
   at least one receiver to receive at least one first signal, wherein the at least one receiver is disposed within an opening for each of the at least one receiver on the outer skin of the EM panel, and
   wherein the EM panel is disposed within an opening on a surface of the aircraft such that the outer skin of the EM panel is flush with the surface of the aircraft to minimize air resistance on the surface of the aircraft.

2. The panel of claim 1, wherein at least one of the at least one receiver is at least one of an optical sensor or a radio frequency (RF) antenna.

3. The panel of claim 1, wherein the at least one receiver comprises a structural housing.

4. The panel of claim 1, wherein the EM panel further comprises:
   at least one transmitter to transmit at least one second signal,
   wherein the at least one transmitter is disposed within an opening for each of the at least one transmitter on the outer skin of the EM panel.

5. The panel of claim 4, wherein at least one of the at least one transmitter is at least one of a laser or a RF antenna.

6. The panel of claim 4, wherein the at least one transmitter comprises a structural housing.

7. The panel of claim 1, wherein the EM panel is replaceable as a single unit.

8. The panel of claim 1, wherein the EM panel is one of a regular shape or an irregular shape.

9. The panel of claim 1, wherein the core is three-dimensionally (3D) printed.

10. The panel of claim 1, wherein the EM panel further comprises a structural frame that wraps around a perimeter of the EM panel.

11. The panel of claim 1, wherein at least one of the at least one receiver or the at least one transmitter comprises an array antenna.

12. The panel of claim 11, wherein the array antenna is an extremely high frequency band (EHF-band) array antenna.

13. The panel of claim 11, wherein the array antenna is an active electronically scanned array (AESA) radar aperture.

14. The panel of claim 1, wherein at least one of the at least one transmitter is an active electronically scanned laser aperture.

15. The panel of claim 1, wherein at least one of the at least one receiver is a near infra-red (NIR) sensor.

16. The panel of claim 1, wherein at least one of the at least one receiver is a mid-wave (MW) sensor.

17. The panel of claim 1, wherein at least one of the at least one receiver is a visible light (VIS) sensor.

18. The panel of claim 1, wherein at least one of the at least one receiver is a long-wave (LW) sensor.

19. The panel of claim 1, wherein the EM panel further comprises a precision clock.

20. The panel of claim 19, wherein the precision clock is an atomic clock.

* * * * *